United States Patent [19]
Griffiths

[11] Patent Number: 5,513,527
[45] Date of Patent: May 7, 1996

[54] FUEL-GAUGING SYSTEMS

[75] Inventor: David M. Griffiths, Hampshire, England

[73] Assignee: Smiths Industries Public Limited Company, London, England

[21] Appl. No.: 433,558

[22] Filed: May 3, 1995

[30] Foreign Application Priority Data

Jun. 9, 1994 [GB] United Kingdom .................. 9411525

[51] Int. Cl.⁶ .......................... G01F 17/00; G01F 23/00; G08B 21/00; G06G 7/57
[52] U.S. Cl. ................. 73/149; 73/304 R; 73/304 C; 340/945; 364/509; 364/550; 364/564; 364/424.01
[58] Field of Search ................... 73/149, 304 R, 73/304 C; 364/509, 424.01, 550, 558, 564; 340/945

[56] References Cited

U.S. PATENT DOCUMENTS 3,895,223  7/1975  Neuner et al. ........................... 235/153
4,420,976  12/1983  Orloff et al. ........................... 73/304 C
4,918,619  4/1990  Orloff et al. ............................ 364/509
5,289,377  2/1994  Yokote et al. ...................... 364/424.04

*Primary Examiner*—Richard Chilcot
*Assistant Examiner*—Paul D. Amrozowicz
*Attorney, Agent, or Firm*—Pollock, Vande Sande & Priddy

[57] ABSTRACT

An ultrasonic fuel-gauging system for an aircraft with three fuel tanks has probes in each tank connected to dual-lane data concentrator circuits. The digital outputs from one lane of the data concentrator circuits are supplied to respective tank circuits, the outputs of which are connected to two input/output circuits. The outputs of the other lanes of the data concentrator circuits are connected directly to one or the other of the two input/output circuits. The tank circuits and input/output circuits are processors of identical construction programmed with different software. If a tank circuit or input/output circuit should fail, its function is taken over by reconfiguration of one of the remaining processors.

10 Claims, 2 Drawing Sheets

FUEL-GAUGING SYSTEMS

BACKGROUND OF THE INVENTION

This invention relates to fuel-gauging systems.

The invention is more particularly, but not exclusively, concerned with fuel-gauging systems in aircraft.

Accurate fuel gauging in an aircraft plays an important part in the economic operation of the aircraft. If the quantity of fuel on an aircraft can be measured accurately and reliably it enables the minimum amount of fuel to be carried without any risk of danger. In a modern aircraft the weight of fuel can account for half the total weight of the aircraft. By reducing the amount of fuel carried, more passengers or freight can be carried. Alternatively, it can enable the aircraft to have a longer range and reduce the need for refuelling stops. Modern fuel-gauging systems can be highly accurate when operating correctly but there is always a risk that an element in the system, such as a probe or processor, will fail leading to a loss, or a reduction in accuracy, of the fuel quantity measurement in one of the tanks. It is possible to provide redundancy in the system by duplicating elements of the system so that failure of any one element will not damage the system accuracy. However, this duplication can lead to increased cost, weight and power consumption.

BRIEF SUMMARY OF THE INVENTION

It is an object of the present invention to provide an improved fuel-gauging system.

According to one aspect of the present invention there is provided a fuel-gauging system for at least two fuel tanks including first and second processors associated with respective ones of the tanks, the first and second processors being arranged to receive output signals derived from a fuel-gauging probe in the associated tank and to provide outputs indicative of fuel quantity in the respective tank, the system including third and fourth processors both arranged to receive the outputs from both the first and second processors and to provide nominally-identical outputs indicative of the fuel quantity in both tanks, and the third and fourth processors being also arranged to receive the output signals derived from the probes without processing by the first or second processor and being arranged such that, in the event of a failure of the first processor, the third processor is configured to perform in the same way as the first processor and provide an output to the fourth processor indicative of fuel quantity in the first tank and, in the event of a failure of the second processor, the fourth processor is configured to perform in the same way as the second processor and provide an output to the third processor indicative of fuel quantity in the second tank.

In the event of a failure of both the third and fourth processors, the system may be arranged such that one of the first or second processors is configured to perform in the same way as the third or fourth processor. The first, second, third and fourth processors are preferably of identical construction and are configured to perform in different ways by programming with different software. The system may include two data concentrator circuits associated with each tank arranged to convert the output signals from the fuel-gauging probes into a digital form, the first and third processors being connected to receive outputs from respective ones of the data concentrator circuits associated with one tank, and the second and fourth processors being connected to receive outputs from respective ones of the data concentrator circuits associated with the other tank.

The system may include a third fuel tank and a fifth processor arranged to receive an output from a fuel-gauging probe in the third tank and to provide an output indicative of fuel quantity in the third tank, the fifth processor being connected to supply an output signal to both the third and fourth processors. The fuel-gauging probe in the third tank is preferably connected to supply an output signal to the third or fourth processor without processing by the fifth processor. The fifth processor is preferably of identical construction to the first, second, third and fourth processors. The system may include two data concentrator circuits associated with the third tank arranged to convert the output signals from the fuel-gauging probe in the third tank into a digital form, the fifth processor being connected to receive the output from one of the data concentrator circuits associated with the third tank, and the other of the data concentrator circuits associated with the third tank being connected to supply its output to either the third or fourth processor.

A fuel-gauging system for an aircraft will now be described, by way of example, with reference to the accompanying drawings.

DETAILED DESCRIPTION OF THE PREFERRED EMBODIMENTS

Figure 1:
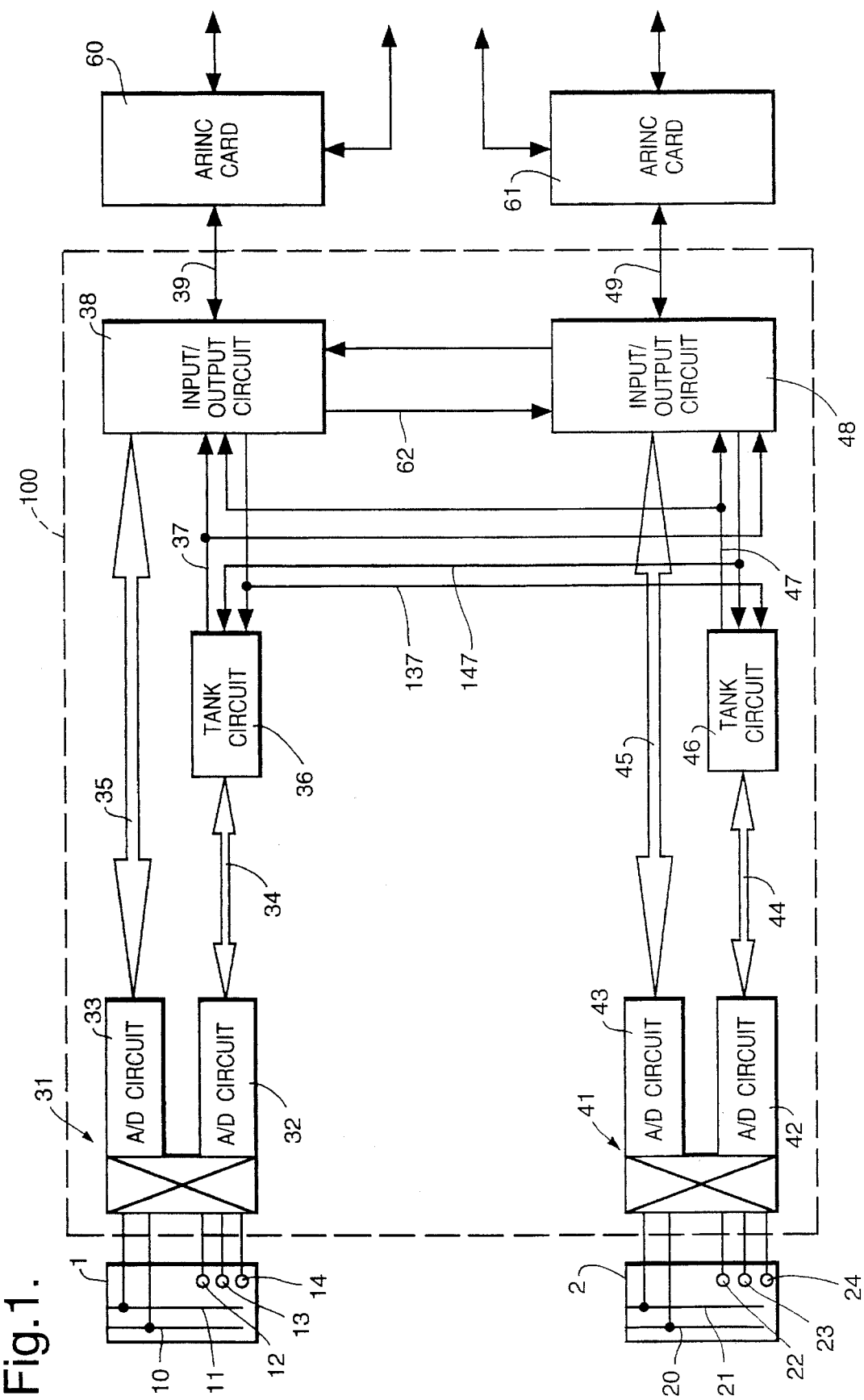
FIG. 1 is a schematic diagram of a system for two fuel tanks.

With reference first to FIG. 1, there is shown a fuel-gauging system 100 for measuring the quantity of fuel in the left tank 1 and the right tank 2 of an aircraft. The left tank 1 has at least two fuel height probes 10 and 11, although usually more than two probes are provided to enable the orientation of the fuel surface to be determined in different aircraft attitudes. The probes 10 and 11 are ultrasonic fluid height probes, such as of the kind described in GB2265219 or GB2265005, although any other conventional probe could be used, such as a capacitance probe. The tank also includes a temperature sensor 12, a densitometer 13 and a water detector 14 of conventional construction. Identical probes 20 and 21 and sensors 22 to 24 are included in the right tank 2, which is of the same shape as the left tank 1.

The outputs of the probes 10 and 11 and the sensors 12 to 14 are connected to a data concentrator 31, which has two identical, parallel circuits 32 and 33 both of which receive the tank output signals. The circuits 32 and 33 convert the tank outputs into digital signals and provide nominally-identical signals onto respective data lines 34 and 35. The outputs from the right tank 2 are similarly converted into digital signals in a data concentrator 41, identical to the left data concentrator 31, and supplied on lines 44 and 45. Because the quantity of fuel in the left tank 1 will not in general be the same as that in the right tank 2, the signals on lines 34 and 35 will differ from those on lines 44 and 45.

The left lane has a first processor or tank circuit 36 having its input connected to the data line 34. The tank circuit 36 computes the quantity of fuel in the left tank 1 in terms of mass or volume. Similarly, the right lane has a second processor or tank circuit 46 with an input connected to the data line 44. The tank circuit 46 computes the quantity of fuel in the right tank 2. These signals indicating the quantity of fuel in the left and right tanks are supplied on lines 37 and 47 respectively to third and fourth processors or input/output circuits 38 and 48. The input/output circuit 38 in the left lane also receives signals on line 47 from the right lane tank circuit 46 so that it can compute the total mass of fuel in the two tanks 1 and 2. The right lane input/output circuit 48 also receives signals on line 37 from the left tank circuit 36 and computes the total mass of fuel. The data lines 35 and 45 are connected to the inputs of the input/output circuits 38 and 48 but, in normal operation, the circuits do not respond to signals on these lines. The outputs of the circuits 38 and 48 are supplied on lines 39 and 49 to respective ARINC databus cards 60 and 61, which communicate the fuel-gauging information to the aircraft instrumentation and controls.

The two tank circuits 36 and 46, and the two input/output circuits 38 and 48 are all provided by processors of identical hardware construction but are configured to operate differently by virtue of the different parts of the software installed in the processors, so that they function either as a tank circuit or as an input/output circuit.

In normal operation, fuel quantity information from the left tank 1 is converted to digital form in the circuit 32 of data concentration 31 and supplied to the tank circuit 36. The tank circuit 36 computes the fuel quantity in the tank 1 and supplies this information to both input/output circuits 38 and 48. The two input/output circuits 38 and 48 receive information about the quantity in the two tanks and compute two nominally-identical indications of the total fuel quantity, which are supplied onto the aircraft databus.

The system is arranged such that failure of any one of the elements in the system will not prevent gauging or degrade the performance and accuracy of the system. Furthermore, no failure of two elements in the system will cause a total loss of gauging although it might cause loss of gauging in one tank or reduced accuracy.

If, for example, the circuit 32 in the data concentrator 31 should fail, this would be identified by the tank circuit 36 and cause it to signal the failure to the input/output circuit 38. This would cause the input/output circuit 38 to run different software so that it became configured to perform the function of the tank circuit 36. The circuit 38 now processes the information on line 35 from the working circuit 33 in the data concentrator 31 to derive an indication of the quantity of fuel in the left tank 1. The circuit 38 provides an output on line 62 to an input of the input/output circuit 48 representative of fuel quantity in the left tank 1 and, from this, the input/output circuit 48 computes the total fuel quantity and provides this as the sole output of the system.

Similarly, if the tank circuit 36 should fail, the input/output circuit 38 would identify this failure and would again be configured to perform as a tank circuit and would provide an output to the right lane input/output circuit 48 via line 137 and the tank circuit 46. The output of the input/output circuit 38 would be derived from the output of the circuit 33 in the data concentrator 31. Corresponding failures in the right lane would cause the right input/output circuit 48 to be configured as a tank circuit.

It can be seen, therefore, that it is not necessary in the present invention to duplicate the tank circuit 36 or 46 in either lane.

Failure of the left lane input/output circuit 38 would still enable the right lane circuit 48 to receive the output from the left tank circuit 36.

If two elements in one lane should fail, such as, for example, both circuits 32 and 33 in the data concentrator 31, this would lead to complete loss of information about the left tank 1 but it would not affect operation of the right lane and the system would still be able to provide an indication of fuel quantity in the right tank 2. The system can also provide an indication of fuel quantity if both input/output circuits 38 and 48 should fail. If this should happen, one of the tank circuits 36 or 46 would be reconfigured as an input/output circuit. If, for example, the right tank circuit 46 were reconfigured as an input/output circuit it would no longer process the data on line 44 but instead would process the output of the left tank circuit 36 and provide an output on line 47 representative of fuel quantity in the left tank 1 in a suitable form for supply to the ARINC card 61. In these circumstances the signals on line 47 would either bypass the circuit 48 or pass through the circuit without being affected by it.

Figure 2:
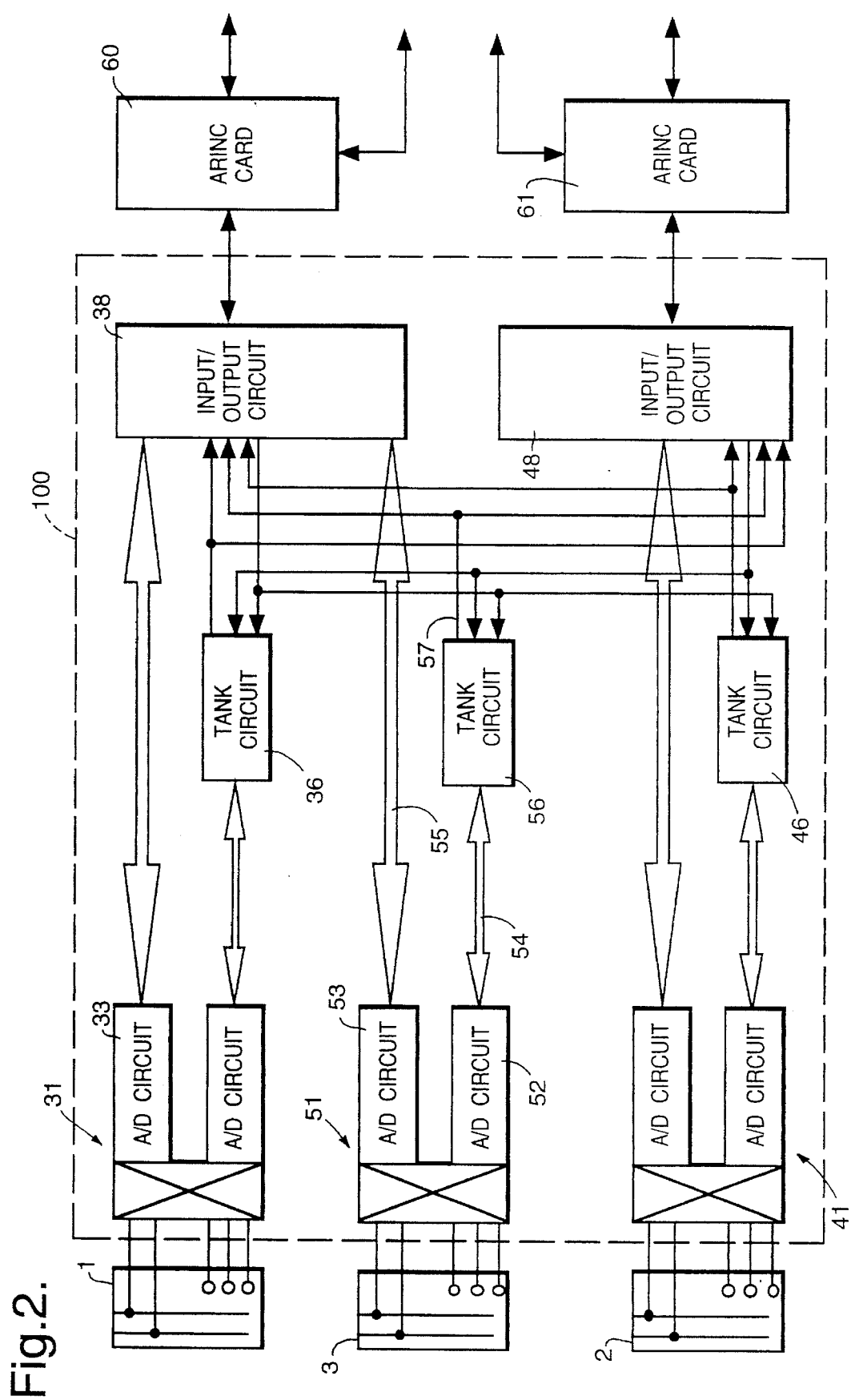
FIG. 2 is a schematic diagram of a system for three fuel tanks.

With reference now to FIG. 2 there is shown a system for use with three tanks 1 to 3, the third tank 3 being located centrally in the aircraft. The outputs of the probes and sensors in the third tank 3 are supplied to a central data concentrator 51 having two identical, parallel circuits 52 and 53. The output of one of the circuits 52 is connected via line 54 to a tank circuit 56 identical to the left and right tank circuits 36 and 46. The output of the other circuit 53 is connected via line 55 directly to the left input/output circuit 38, although it could be connected to the right input/output circuit 48. The output of the central tank unit 56 is connected via line 57 to both the left and right input/output circuits 38 and 48.

In normal operation, the central tank unit 56 provides an output indicative of the quantity of fuel in the central tank 3 and this is summed by both input/output circuits 38 and 48 so that the outputs of both input/output circuits represent the total fuel quantity in all three tanks and the individual quantities in each of the three tanks.

Failure of any one of the elements in the central lane again has no effect on the performance and accuracy of the system. For example, if the central tank circuit 56 should fail, the left input/output circuit 38 would be reconfigured to take over its function.

The present invention enables a high degree of reliability to be provided without the need for a large amount of processing capacity.

What I claim is:

1. A fuel-gauging system for at least two fuel tanks comprising: first and second processors associated with respective ones of the tanks; a fuel-gauging probe in each tank; connections between an output of each probe and said first and second processors such that said processors provide outputs indicative of fuel quantity in the respective tank; third and fourth processors; connections between each of said outputs of said first and second processors and said third and fourth processors such that said third and fourth processors both receive outputs from both of said first and second processors and provide nominally-identical outputs indicative of the fuel quantity in both tanks; and connections between inputs of said third and fourth processors and said probes without processing by the first or second processor such that, in the event of a failure of said first processor, said third processor is configured to perform in the same way as said first processor and to provide an output to said fourth processor indicative of fuel quantity in said first tank and, in the event of a failure of said second processor, said fourth processor is configured to perform in the same way as said second processor and provide an output to said third processor indicative of fuel quantity in said second tank.

2. A fuel-gauging system according to claim 1, including a connection between the output of the first processor and the input of the second processor and a connection between the output of the second processor and the input of the first processor, wherein one of said first or second processors is configured to perform in the same way as said third or fourth processor if both said third and fourth processors should fail.

3. A fuel-gauging system according to claim 1, wherein said first, second, third and fourth processors are of identical construction and are configured to perform in different ways by programming with different software.

4. A fuel-gauging system according to claim 1, including two data concentrator circuits associated with each tank, a connection between each data concentrator circuit and said fuel-gauging probes in the associated tank such that the data concentrator circuits convert the output signals from the fuel-gauging probes into a digital form, wherein said first and third processors are connected to receive outputs from respective ones of said data concentrator circuits associated with one tank, and wherein said second and fourth processors are connected to receive outputs from respective ones of said data concentrator circuits associated with the other tank.

5. A fuel-gauging system according to claim 1 including a third fuel tank, a fuel probe in the third tank, a fifth processor, a connection between said fuel probe in said third tank and said fifth processor such that said fifth processor provides an output indicative of fuel quantity in the third tank, and connections between the fifth processor and both the third and fourth processors, such that the fifth processor supplies output signals to both said third and fourth processors.

6. A fuel-gauging system according to claim 5 including a connection between said fuel-gauging probe in said third tank and one of said third and fourth processors such that said third or fourth processor receives signals from said fuel-gauging probe in said third tank without processing by said fifth processor.

7. A fuel-gauging system according to claim 5, wherein said fifth processor is of identical construction to said first, second, third and fourth processors.

8. A fuel-gauging system according to claim 6, including two data concentrator circuits associated with said third tank arranged to convert the output signals from said fuel-gauging probe in said third tank into a digital form, a connection between said fifth processor and an output from one of said data concentrator circuits associated with said third tank, and a connection between the other of said data concentrator circuits associated with said third tank and either said third or fourth processor.

9. A fuel-gauging system comprising: three fuel tanks; three processors associated with respective ones of the tanks; a fuel-gauging probe in each tank; means connecting an output of each probe to respective ones of said three processors such that said processors provide outputs indicative of fuel quantity in the respective tank; two further processors; connections between each of said outputs of said three processors and inputs of said two further processors such that said two further processors both receive outputs from each of said three processors and provide nominally-identical outputs indicative of the fuel quantity in all three tanks; and connections between inputs of said two further processors and said probes without processing by the three processors such that, in the event of a failure of one of said three processors, one of said further two processors is configured to perform in the same way as the failed processor and provide an output to the other one of said further processors indicative of fuel quantity in the associated tank.

10. A fuel-gauging system according to claim 9, including two data concentrator circuits associated with each said tank, and a connection between an output of one of said data concentrator circuits of each tank and one of said two further processors without processing by said three processors.

* * * * *